United States Patent
Suzuki et al.

(10) Patent No.: US 8,089,950 B2
(45) Date of Patent: Jan. 3, 2012

(54) WIRELESS COMMUNICATION EQUIPMENT AND WIRELESS COMMUNICATION METHOD

(75) Inventors: Motoshi Suzuki, Kanagawa (JP); Shohei Taniguchi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 767 days.

(21) Appl. No.: 11/571,892

(22) PCT Filed: Jul. 13, 2005

(86) PCT No.: PCT/JP2005/012950
§ 371 (c)(1),
(2), (4) Date: Jan. 10, 2007

(87) PCT Pub. No.: WO2006/006629
PCT Pub. Date: Jan. 19, 2006

(65) Prior Publication Data
US 2008/0056166 A1    Mar. 6, 2008

(30) Foreign Application Priority Data
Jul. 14, 2004   (JP) .................................. 2004-206934

(51) Int. Cl.
*H04J 3/06*   (2006.01)

(52) U.S. Cl. .................................... 370/350; 370/503
(58) Field of Classification Search .................. 370/328, 370/331–332, 338, 341, 346–348, 350, 503–511
See application file for complete search history.

(56) References Cited

U.S. PATENT DOCUMENTS

| | | | |
|---|---|---|---|
| 6,125,138 A | 9/2000 | Kumagai | |
| 7,570,976 B2 * | 8/2009 | Jin et al. | 455/574 |
| 7,590,106 B2 * | 9/2009 | Kusnitz et al. | 370/353 |
| 2005/0186962 A1 * | 8/2005 | Yoneyama et al. | 455/435.2 |
| 2008/0008124 A1 * | 1/2008 | Hundal et al. | 370/328 |

FOREIGN PATENT DOCUMENTS

| | | |
|---|---|---|
| JP | 10-84309 | 3/1998 |
| JP | 2000-36807 A | 2/2000 |

\* cited by examiner

*Primary Examiner* — Pao Sinkantarakorn
(74) *Attorney, Agent, or Firm* — Pearne & Gordon LLP

(57) ABSTRACT

A mobile station 200 includes a receiving field level detecting unit 213 to convert a level of a wireless signal into an RSSI output, and a wireless frame timing deciding unit 214 to decide a wireless frame timing from the transient characteristic of the RSSI output. By deciding the wireless frame timing from the RSSI output, synchronous establishment can be realized even when the mobile station 200 does not include a demodulation circuit. The mobile station can perform the synchronous establishment without being increased in size.

8 Claims, 10 Drawing Sheets

WIRELESS COMMUNICATION EQUIPMENT AND WIRELESS COMMUNICATION METHOD

TECHNICAL FIELD

The present invention relates to a digital wireless communication equipment and wireless communication method in which two-way communication is performed in a time division duplex system (hereinafter referred to as a TDD system).

BACKGROUND ART

In a conventional digital wireless communication equipment of the TDD system, the reception clock is synchronized with the transmission clock of a wireless communication equipment of a base station, one frame is divided into two time slots, and the mobile station and the base station perform the wireless communication in the same frequency. On the other hand, the mobile station uses the frame timing, receives the frame synchronization in synchronization with the time slot of the base station, and by this, can receive only the signal of the terminal of a communication partner.

However, in the mobile station immediately after power-on, or the mobile station immediately after it has been moved from the outside of a wireless communication enable area into the inside of the area, the receive clock is not synchronous with the transmission clock of the wireless communication equipment of the base station, and the frame timing is not also known.

Thus, the mobile station first synchronously receives the communication frequency continuously, and waits for a signal from the base station. The signal from the base station includes a preamble bit repeating a fixed pattern. The mobile station receives the preamble bit asynchronously to reproduce the clock, and synchronizes its own reception clock with this. Further, the signal from the base station contains a synchronous bit, and the base station receives this bit by the clock synchronized with the mobile station.

By this, from a previously determined frame structure and the position of the received synchronous bit, the mobile station grasps the frame synchronous timing of the base station. This is called synchronous establishment.

Conventionally, this type of wireless communication equipment and synchronous establishment method are disclosed in, for example, JP-A-10-84309 (see FIG. 1 and FIG. 3).

However, in the conventional wireless communication equipment, in order that the mobile station side performs the synchronous establishment, it is necessary for the mobile station side to have a demodulation circuit. As a result, the circuit mounting area becomes large, and the mobile station becomes large.

DISCLOSURE OF THE INVENTION

Problems that the Invention is to Solve

The invention has been made to solve the above conventional problems, and has an object to provide a wireless communication equipment and a wireless communication method in which the synchronization establishment can be performed without requiring a demodulation circuit on a mobile station side and without enlarging the mobile station.

Means for Solving the Problems

A wireless communication equipment of the invention is a wireless communication equipment to perform two-way communication between a first transmitter-receiver and a second transmitter-receiver in a time division duplex system, the first transmitter-receiver includes control signal generating means for generating a control signal, first wireless frame creating means for creating wireless frame data based on the control signal, and first transmission means for converting the wireless frame data into a wireless signal and transmitting it in an up-link of the time division duplex system, and the second transmitter-receiver includes first receiving means for receiving the wireless signal, receiving field level detecting means for detecting a transient characteristic of a received field level of the wireless signal received by the first receiving means, and wireless frame timing deciding means for deciding a wireless frame timing from the transient characteristic.

According to another aspect of the invention, a wireless communication equipment performs two-way communication between a first transmitter-receiver and a second transmitter-receiver in a time division duplex system. In this wireless antenna equipment, the first transmitter-receiver includes a control signal generating unit to generate a control signal, a first wireless frame creating unit to create wireless frame data based on the control signal, and a first transmission unit to convert the wireless frame data into a wireless signal and to transmit it in an up-link of the time division duplex system, and the second transmitter-receiver includes a first receiving unit to receive the wireless signal, a receiving field level detecting unit to detect a transient characteristic of a received field level of the wireless signal received by the first receiving unit, and a wireless frame timing deciding unit to decide a wireless frame timing from the transient characteristic.

According to another aspect of the invention, a wireless communication equipment performs two-way communication between a base station and a mobile station in a time division duplex system. In this wireless antenna equipment, the base station includes a control signal generating unit to generate a control signal, a base station side wireless frame creating unit to create wireless frame data based on the control signal, and a base station side transmission unit to convert the wireless frame data into a wireless signal and to transmit it in an up-link of the time division duplex system, and the mobile station includes a mobile station side receiving unit to receive the wireless signal, a receiving field level detecting unit to detect a transient characteristic of a received field level of the wireless signal received by the receiving unit, and a wireless frame timing deciding unit to decide a wireless frame timing from the transient characteristic.

According to another aspect of the invention, a wireless communication method in a wireless communication equipment performs communication in a time division duplex system. This wireless communication method includes detecting a transient characteristic of a received field level, calculating a wireless frame timing from a detection result of the transient characteristic, creating a wireless frame at the calculated timing, and starting a wireless communication operation of the TDD system at the created wireless frame timing.

As described below, the invention includes other aspects. Accordingly, the disclosure of the invention is intended to provide partial aspects of the invention, and is not intended to limit the scope of the invention described and claimed here.

Figure 1:
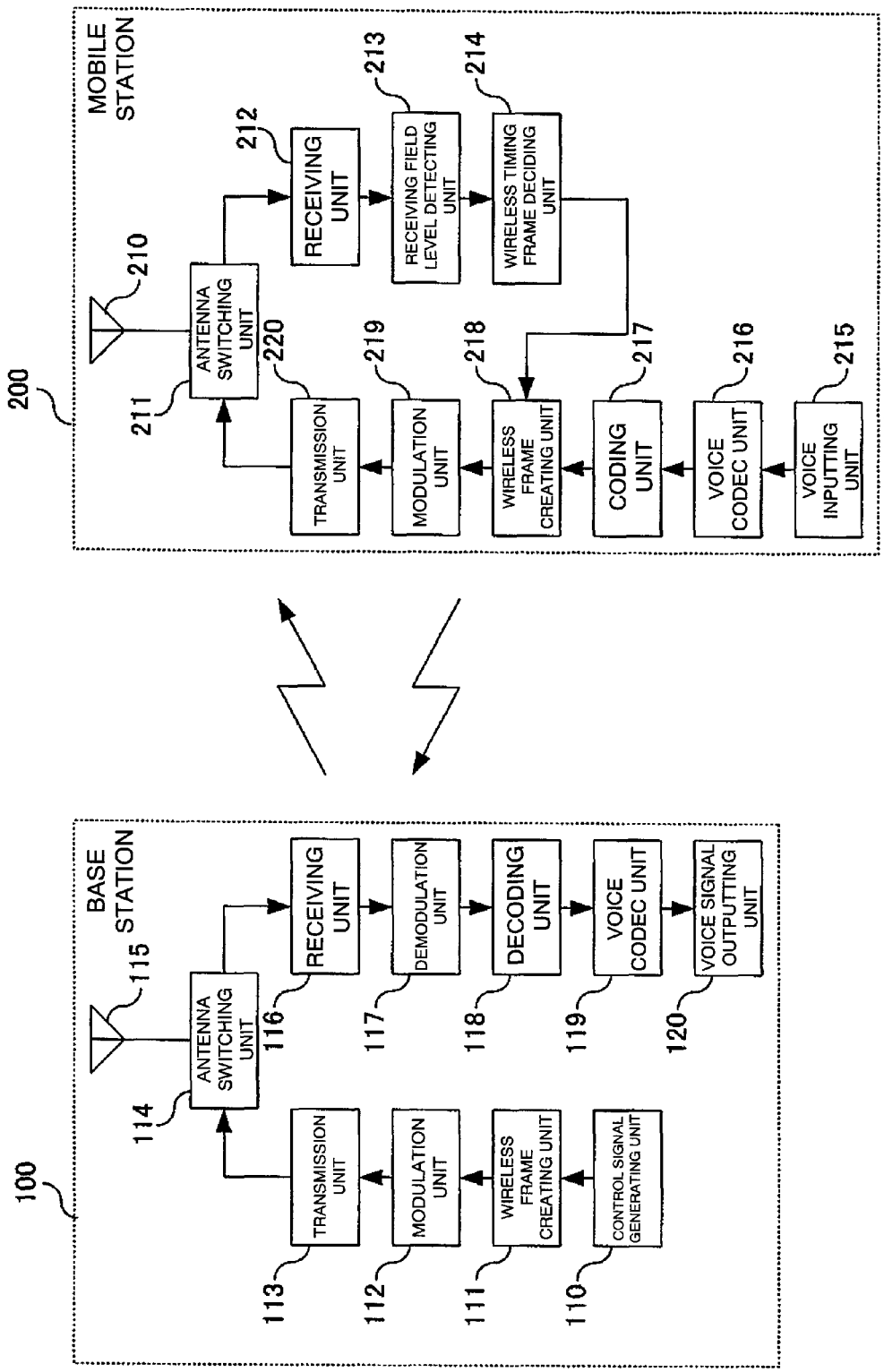
FIG. 1 is a block diagram of a wireless communication equipment of a first embodiment of the invention.

DESCRIPTION OF REFERENCE NUMERALS AND SIGNS 100 base station
110 control signal generating unit
111 wireless frame creating unit
112 modulation unit
113 transmission unit
114 antenna sharing unit
115 antenna
116 receiving unit
117 demodulation unit
118 decoding unit
119 voice codec unit
120 voice signal outputting unit
200 mobile station
210 antenna
211 antenna switching unit
212 receiving unit
213 receiving field level detecting unit
214 wireless frame timing deciding unit
215 voice inputting unit
216 voice codec unit
217 coding unit
218 wireless frame creating unit
219 modulation unit
220 transmission unit
300 base station
310 synchronizing signal judgment unit
400 mobile station
410 synchronizing signal generating unit
500 mobile station
510 received power estimation unit
511 transmission power control unit

BEST MODE FOR CARRYING OUT THE INVENTION

Hereinafter, a detailed description of the invention will be made. However, the following detailed description and the attached drawings do not limit the invention. Instead, the scope of the invention is regulated by the appended claims.

A wireless communication equipment of the invention is a wireless communication equipment to perform two-way communication between a first transmitter-receiver and a second transmitter-receiver in a time division duplex system, the first transmitter-receiver includes control signal generating means for generating a control signal, first wireless frame creating means for creating wireless frame data based on the control signal, and first transmission means for converting the wireless frame data into a wireless signal and transmitting it in an up-link of the time division duplex system, and the second transmitter-receiver includes first receiving means for receiving the wireless signal, receiving field level detecting means for detecting a transient characteristic of a received field level of the wireless signal received by the first receiving means, and wireless frame timing deciding means for deciding a wireless frame timing from the transient characteristic.

By this structure, the wireless frame of the first transmitter-receiver is detected from the transient characteristic of the received field level and the synchronization establishment can be performed.

Besides, the second transmitter-receiver may include coding means for coding the control signal and a voice signal, second wireless frame creating means for creating wireless frame data based on the signal coded by the coding means at the wireless frame timing decided by the wireless frame timing deciding means, and second transmission means for converting the wireless frame data signal created by the second wireless frame creating means into a wireless signal and transmitting it in a down-link of the time division duplex system. The first transmitter-receiver may include second receiving means for receiving the wireless signal of the down-link, and decoding means for decoding the wireless signal of the down-link.

By this structure, the two-way communication of the TDD system can be realized.

Further, the second transmitter-receiver may include synchronizing signal generating means for generating a synchronizing signal to be multiplexed onto the down-link, and the first transmitter-receiver may include synchronizing signal judgment means for performing synchronization judgment by detecting the synchronizing signal.

By this structure, it becomes possible to perform synchronization correction in the down-link, and as a result, synchronization precision can be improved, and data transmission with a high detection rate can be realized.

Further, the second transmitter-receiver may include received power estimation means for estimating received power from the received field level obtained by the receiving field level detecting means, and transmission power control means for controlling transmission power according to the received power estimated by the received power estimation means.

By this structure, the received field level is detected in the up-link, power loss in an electric wave transmission path between the respective transmitter-receivers can be estimated, and the transmission power control can be performed. Accordingly, a fading suppression effect can be obtained, frequency use efficiency can be improved, and reduction in power consumption can be realized.

Further, a wireless communication method of the invention is a wireless communication method in a wireless communication equipment to perform communication in a time division duplex system, and includes a receiving field level detecting step of detecting a transient characteristic of a received field level, a wireless frame timing calculation step of calculating a wireless frame timing from a detection result at the receiving field level detecting step, a wireless frame creating step of creating a wireless frame at the timing calculated at the wireless frame timing calculation step, and an initial lead-in step of starting a wireless communication operation of the TDD system at the wireless frame timing created at the wireless frame creation step.

By this, the wireless frame timing is detected from the data obtained by the receiving field level detecting means to perform synchronization establishment, and the wireless communication operation can be performed in the TDD system.

As described above, according to the invention, the mobile station side decides the wireless frame timing from the transient characteristic of the received field level, so that the synchronization establishment can be realized even if the mobile station does not include a demodulation circuit.

Hereinafter, embodiments of the invention will be described by use of the drawings.

First Embodiment

FIG. 1 shows a wireless communication equipment of a first embodiment of the invention. In more detail, FIG. 1 shows a structure of a digital wireless microphone system to perform two-way communication in a TDD system, and this system includes a digital wireless microphone (hereinafter referred to as a mobile station) and a digital wireless microphone receiver (hereinafter referred to as a base station).

Besides, in the following description, terms of an up-link and a down-link are used. The up-link means the link from a base station 100 to a mobile station 200, and the down-link means the link from the mobile station 200 to the base station 100. Incidentally, the transmission frequencies used in both are the same.

The base station 100 includes a control signal generating unit 110 to generate a control signal for controlling the mobile station, a wireless frame creating unit 111 to create wireless frame data based on the generated control signal, a modulation unit 112 to digital-modulate this wireless frame data, a transmission unit 113 to perform frequency conversion of a modulated signal and to transmit a wireless signal to the mobile station, an antenna switching unit 114 to perform switching to the transmission at the time of the up-link and to the reception at the time of the down-link, and an antenna 115 to transmit/receive an electric wave.

Further, the base station 100 includes a receiving unit 116 to extract the wireless signal by performing frequency conversion, a demodulation unit 117 to demodulate a wireless frame data signal from the wireless signal, a decoding unit 118 to extract voice data from the wireless frame data signal and to decode it, a voice codec unit 119 to convert the voice data into a voice signal, and a voice signal outputting unit 120 to output the voice signal to the outside.

The mobile station 200 includes a voice inputting unit 215 to convert the voice of a talker into a voice signal, a voice codec unit 216 to convert the voice signal into a digital signal, a coding unit 217 to code the digital signal and to generate voice data, a wireless frame creating unit 218 to create wireless frame data based on the generated voice data, a modulation unit 219 to perform digital modulation of the wireless frame data signal, a transmission unit 220 to perform frequency conversion of the modulated signal and to transmit a wireless signal to the mobile station, an antenna switching unit 211 to perform switching to the reception at the time of the up-link and to the transmission at the time of the down-link, and an antenna 210 to transmit/receive an electric wave.

Further, the mobile station 200 includes a receiving unit 212 to perform frequency conversion and to extract a wireless signal, a receiving field level detecting unit 213 to convert a level of the wireless signal into an output of a received signal indication signal (Received Signal Strength Indicator, hereinafter referred to as RSSI), and a wireless frame timing deciding unit 214 to calculate the timing of an up-link from the transient characteristic of the RSSI output and to decide wireless frame timing.

The operation of the wireless communication equipment constructed as described above will be described by use of FIG. 1 to FIG. 5.

The outline of the operation will be first described. The base station 100 wireless-transmits the control signal to the mobile station 200, and the mobile station 200 receives the wireless signal from the base station 100 to establish the synchronization. The mobile station 200 wireless-transmits the voice signal of a talker. The base station 100 receives the wireless signal from the mobile station 200, demodulates the voice signal, and outputs the voice signal.

Next, the operation of the wireless communication of the up-link will be described.

Figure 2:
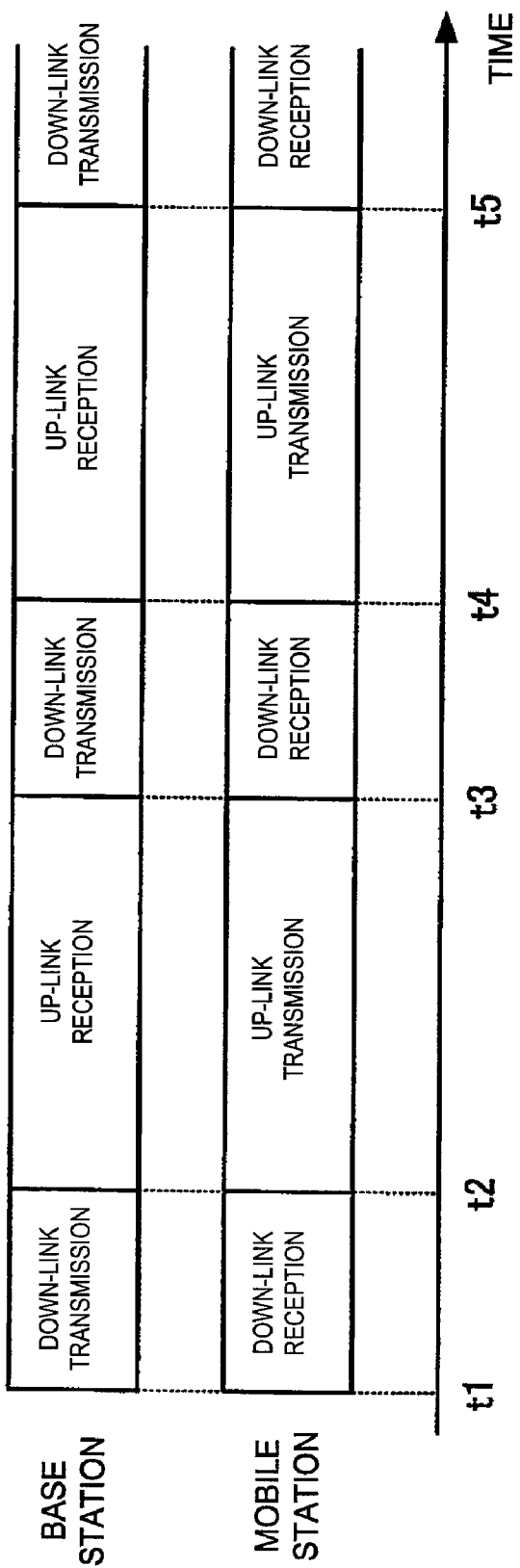
FIG. 2 is a view showing an operation state of a base station and a mobile station in wireless communication of a TDD system.

In the base station 100, the control signal generating unit 110 generates data of a fixed pattern. The wireless frame creating unit 111 performs a wireless frame data creation processing so that the data of the fixed pattern is inserted in a wireless frame of the up-link of the TDD system. By the wireless frame creation processing, as shown in FIG. 2, the data are inserted in the wireless frames so that the wireless signals (between t1 and t2, between t3 and t4) of the up-link and the wireless signals (between t2 and t3, between t4 and t5) of the down-link do not overlap with each other temporally to be transmitted.

The modulation unit 112 performs digital modulation on this wireless frame data signal. The transmission unit 113 performs frequency conversion of the modulated data into a transmission frequency, and further, amplifies the signal so that the transmission power previously determined relatively to the mobile station 200 is obtained, and the wireless signal is generated in this way. Thereafter, the wireless signal is transmitted from the antenna 115 through the antenna sharing unit 114.

The mobile station 200 receives the wireless signal from the base station 100 through the antenna 210 and the antenna sharing unit 211. The wireless signal is amplified by the receiving unit 212. Band limiting is performed by a high frequency filter, and only the wireless signal in the up-link is extracted.

Figure 3:
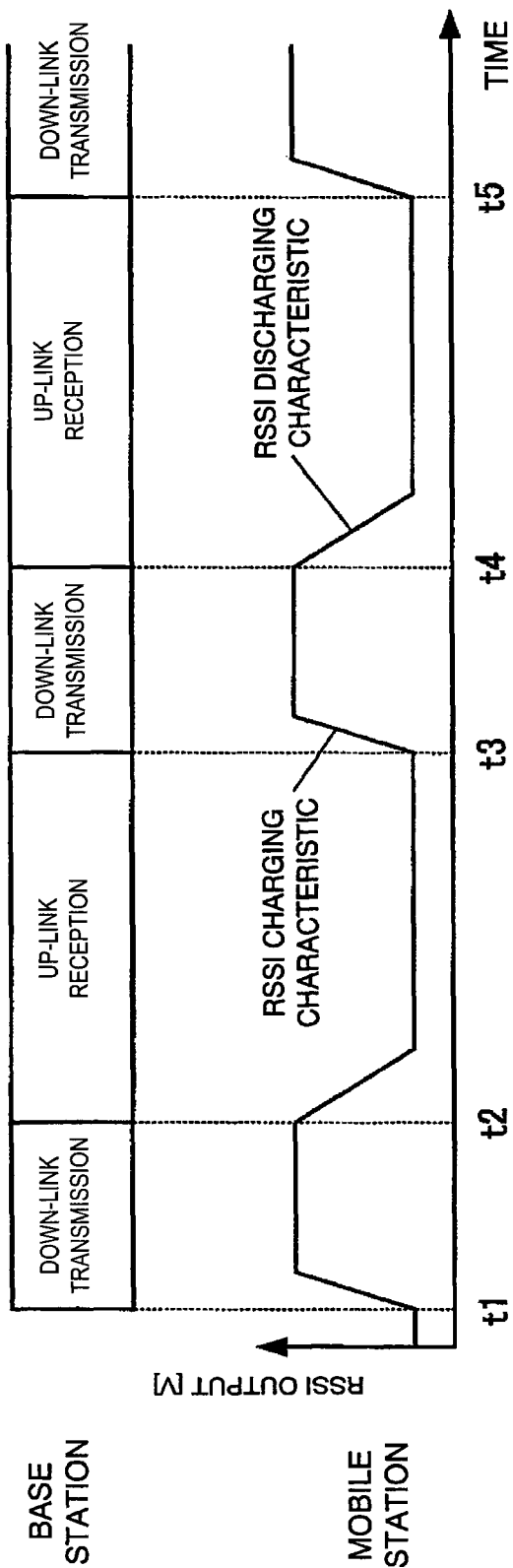
FIG. 3 is a view showing a time relation of an RSSI output waveform relative to a wireless frame structure.

The receiving field level detecting unit 213 converts the level of the wireless signal of the up-link outputted from the receiving unit 212 into an RSSI output. Here, as shown in FIG. 3, the RSSI output is outputted in synchronization with a wireless signal (between t1 and t2, between t3 and t4) of the up-link. The transient characteristic of the RSSI output has a characteristic of charging/discharging by the RSSI circuit.

The wireless frame timing deciding unit 214 calculates the timing of the up-link from the transient characteristic of the RSSI output, estimates the timing of the wireless frame of the base station 100 to establish the synchronization, and decides the wireless frame timing of the mobile station 200 from the estimated wireless frame timing.

Finally, the operation of the wireless communication of the down-link will be described.

After the synchronization establishment is performed in the up-link, the wireless communication of the down-link is started. When a talker inputs a voice to the voice inputting unit 215, the voice is converted into a voice signal. This voice signal is converted into a digital signal by the voice codec unit 216. Further, voice data is generated from this digital signal by the coding unit 217.

The wireless frame creating unit 218 performs a wireless frame data creation processing so that the voice data is inserted into the wireless frame of the down-link of the TDD system at the wireless frame timing decided by the wireless frame timing deciding unit 214 of the up-link.

The digital modulation is performed on the wireless frame data by the modulation unit 219. The transmission unit 220 performs, on this digital modulated data, frequency conversion into a transmission frequency and amplification, and the wireless signal is generated in this way. The wireless signal is transmitted from the antenna 210 through the antenna sharing unit 211.

The base station 100 receives the wireless signal through the antenna 115 and the antenna sharing unit 114. The wireless signal is amplified in the receiving unit 116, and band limiting is performed by the high frequency filter, so that only the wireless signal of the down-link is extracted. The demodulation unit 117 demodulates the wireless frame data signal of the down-link from the wireless signal.

The decoding unit 118 extracts the voice data from the wireless frame data obtained by the demodulation unit 117 and decodes it, and the voice codec unit 119 converts the voice data into the voice signal. The voice signal outputting unit 120 outputs the voice signal to the outside.

As stated above, according to the structure of the first embodiment, in the up-link, the wireless signal from the base station 100 is detected through the RSSI output of the mobile station 200, so that the synchronization establishment can be performed. Accordingly, it is not necessary to provide a demodulation circuit. The wireless communication equipment to perform the frame synchronization establishment can be realized without enlarging the size of the mobile station 200.

Next, the synchronization establishment operation of the mobile station 200 in the up-link will be described by use of FIG. 4.

Figure 4:
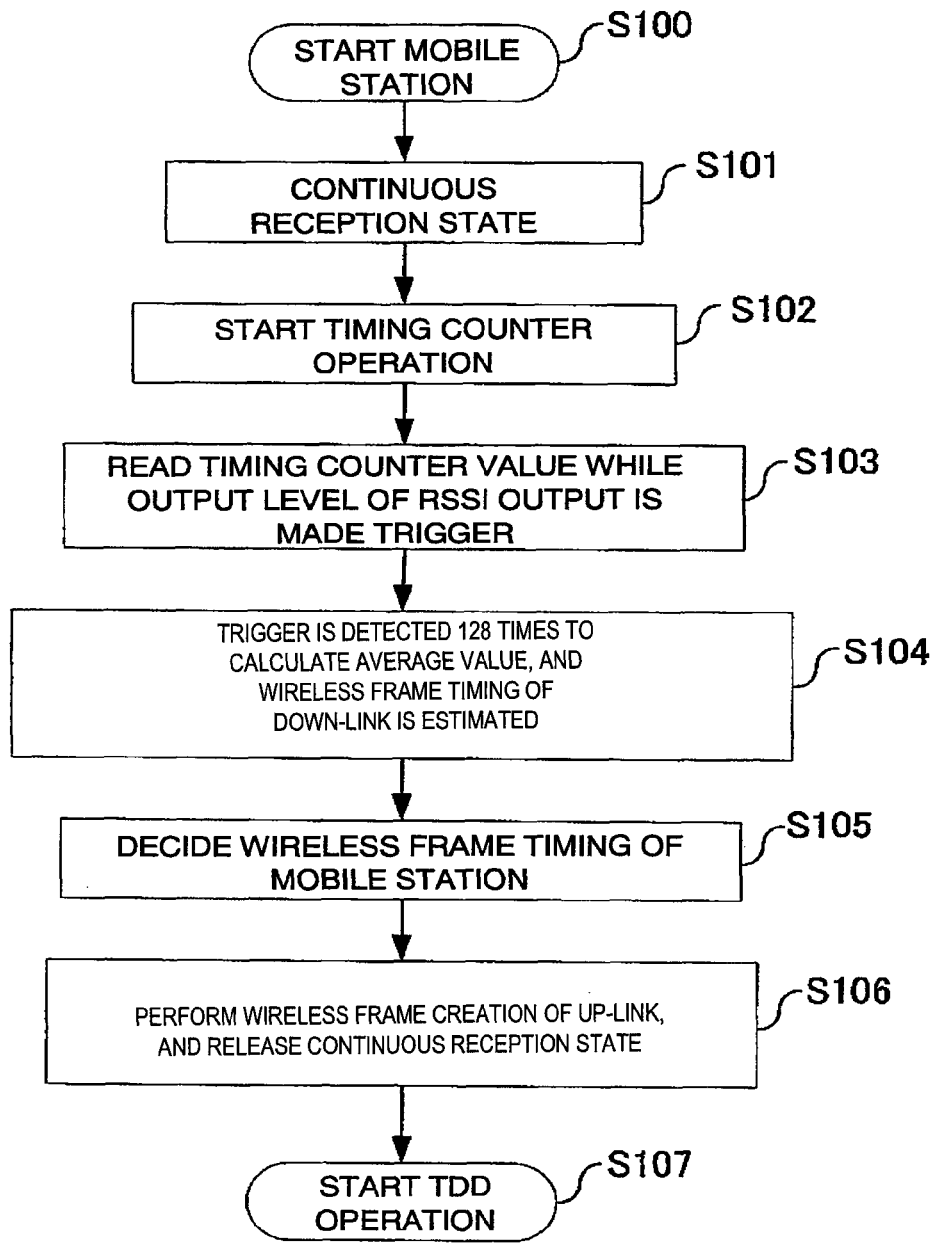
FIG. 4 is a view showing a processing flow of a synchronization establishment operation in a mobile station.

FIG. 4 is a processing flow of the synchronization establishment operation of the mobile station 200.

First, the mobile station 200 starts (step S100).

Next, the mobile station 200 causes the operation of the transmission unit 220 to sleep, and causes the receiving unit 212 and the receiving field level detecting unit 213 to become active, so that the mobile station 200 is brought into the continuous receiving state (step S101).

Next, the mobile station 200 causes a timing counter in the inside of the mobile station 200 to operate. Here, the timing counter is a counter to count with a clock sufficiently faster than the transmission rate. The timing counter is reset when the counting of one frame is performed. Incidentally, in this embodiment, the clock 64 times faster than the transmission rate is used (step S102).

Figure 5:
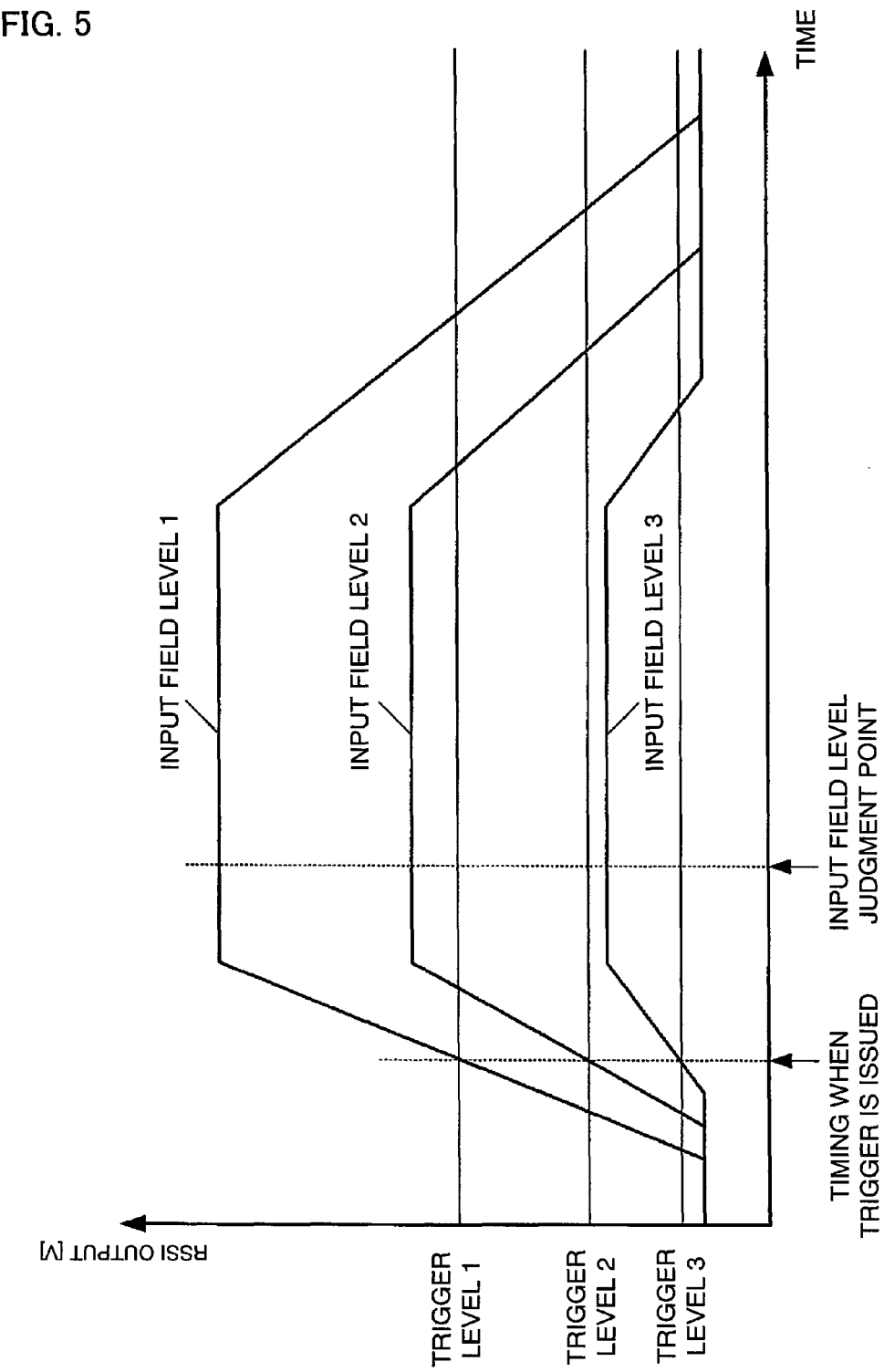
FIG. 5 is a view showing a transient characteristic of an RSSI output for each received field level.

Next, when the RSSI output exceeds a specified trigger level, the value of the timing counter is read. The value of the timing counter is read only at the time of rising. Here, as shown in FIG. 5, the maximum value of the RSSI output, the slant of the rising, and the slant of the falling are changed according to the received field level of the mobile station 200. Then, a table of trigger levels for respective received field levels is set. For example, the RSSI output of an input field level 1 is larger than the RSSI output of an input field level 3. Thus, the trigger levels of both the levels are also different from each other, and are required to be set as a trigger level 1 and a trigger level 3.

Incidentally, in this embodiment, the RSSI output is an average value obtained by integrating the RSSI output sampling value 16 times. The RSSI output is used for relieving the influence of abrupt fading or for relieving the influence of noise of the mobile station 200. The wireless frame timing deciding unit 214 captures the transient characteristic information of the rising of the RSSI output, judges the input field level at an input field level judgment point at which the RSSI output is sufficiently saturated, selects the trigger level, and reads the timing counter value (step S103).

Next, the wireless frame timing deciding unit 214 detects the read timing counter value plural times, and estimates the wireless frame timing of the base station 100 from the average value of these. In this embodiment, the frame timing is detected from 4096 timing counter values (step S104).

Next, the wireless frame timing deciding unit 214 decides the wireless frame timing of the mobile station 200 from the estimated wireless frame timing (step S105).

Next, the mobile station 200 performs the wireless frame creation operation of the down-link at the decided wireless frame timing. The mobile station 200 releases the transmission unit 220, the receiving unit 212, and the receiving field level detecting unit 213 from the continuous receiving state (step S106).

Finally, the mobile station 200 performs the two-way communication operation in the TDD system (step S107).

In this way, by detecting the wireless frame timing of the base station 100 from the transient characteristic of the RSSI output, the synchronization in the up-link can be established in the structure of the first embodiment.

As described above, according to the first embodiment of the invention, the receiving field level detecting unit 213 to convert the level of the wireless signal into the RSSI output and the wireless frame timing deciding unit 214 to decide the wireless frame timing from the transient characteristic of the RSSI output are provided at the mobile station side, so that the synchronization establishment in the up-link can be performed even if a demodulation circuit is not provided.

Incidentally, in the above description, only the rising timing is taken. However, also by detecting an already-risen section (that is, a saturation section or a constant section of the RSSI output) or a falling timing, the same function can be performed.

Second Embodiment

Figure 6:
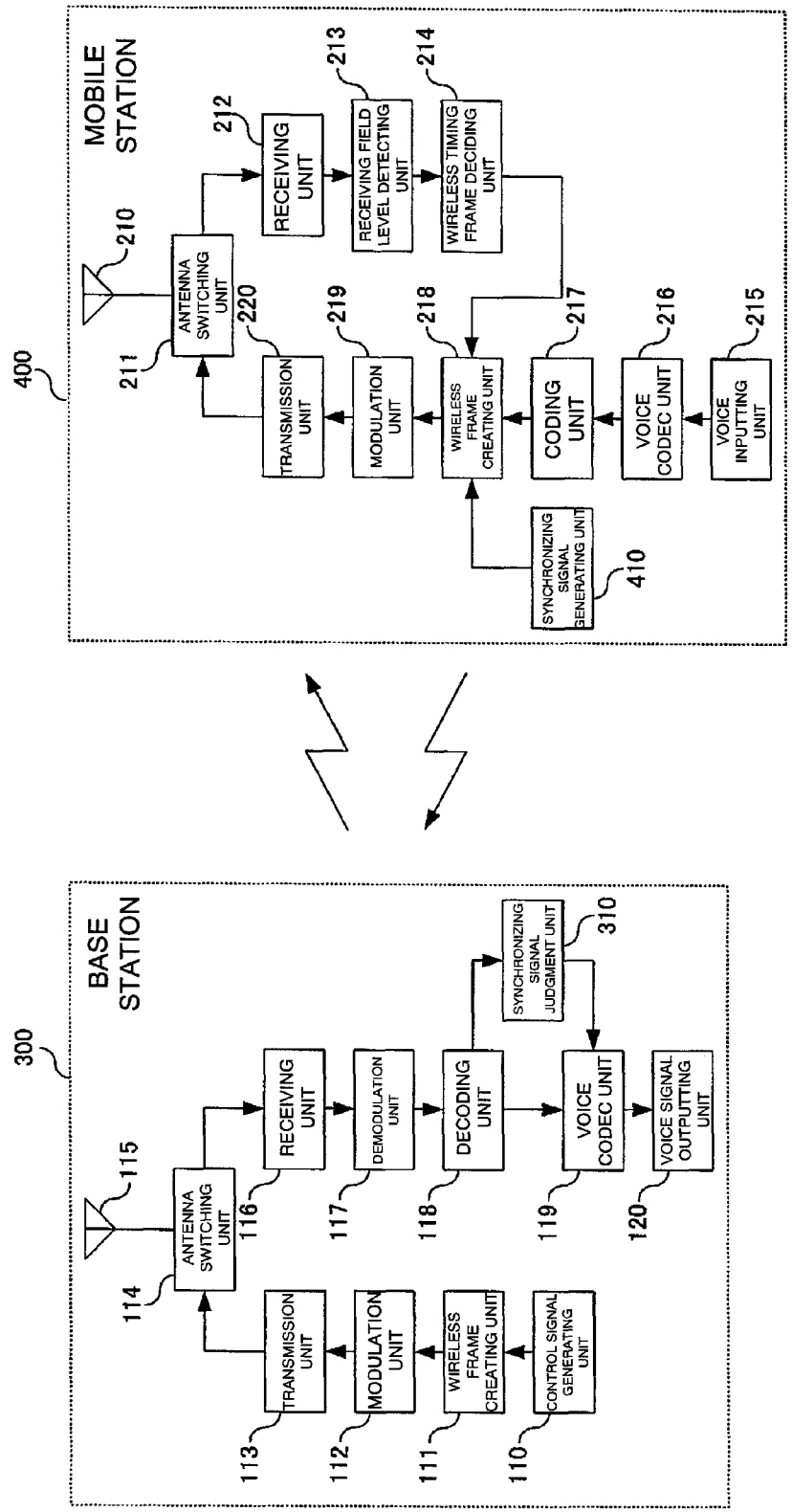
FIG. 6 is a block diagram of a wireless communication equipment of a second embodiment of the invention.

FIG. 6 shows a wireless communication equipment of a second embodiment, and in more detail, shows a structure of a digital wireless microphone system to perform two-way communication in the TDD system. In FIG. 6, components similar to those of the first embodiment are denoted by the same numbers, and their description will be omitted.

As shown in FIG. 6, the wireless communication equipment of the second embodiment is different from the wireless communication equipment of the first embodiment in that a base station 300 includes a synchronizing signal judgment unit 310, and a mobile station 400 includes a synchronizing signal generating unit 410.

Next, the operation of the above wireless communication equipment will be described.

The outline of the operation will be described. The base station 300 wireless-transmits a control signal to the mobile station 400, and the mobile station 400 receives the wireless signal from the base station 300 and establishes the synchronization. The mobile station 400 wireless-transmits a voice signal of a talker and a synchronizing signal of a down-link. The base station 300 receives the wireless signal from the mobile station 400, detects the synchronizing signal to correct the synchronization, and demodulates the voice signal to output the voice signal.

First, the wireless communication of the down-link will be described.

After the synchronization establishment is performed in the up-link by the same wireless communication method as that of the first embodiment, the wireless communication operation in the down-link is started.

The mobile station 400 generates a synchronizing signal previously determined relative to the base station 300 by the synchronizing signal generating unit 410. A wireless frame creating unit 218 uses the synchronizing signal and voice data coded in a coding unit 217 to perform a wireless frame data generation processing. This processing is performed so that the data is inserted into a wireless frame of the down-link of the TDD system at a wireless frame timing decided by a wireless frame timing deciding unit 214. An operation subsequent to this is similar to that of the first embodiment, and the wireless signal is transmitted to the base station 300 in this way.

The base station 300 receives the wireless signal through an antenna 115 and an antenna sharing unit 114. The wireless signal is amplified in a receiving unit 116, and band limiting is performed by a high frequency filter, so that only the wireless signal of the up-link is extracted. A demodulation unit 117 demodulates a wireless frame data signal of the down-link from the wireless signal.

A decoding unit 118 extracts the synchronizing signal from the wireless frame data obtained in the demodulation unit 117 and decodes it. The synchronizing signal judgment unit 310 judges whether or not the synchronizing signals are coincident with each other.

Figure 7:
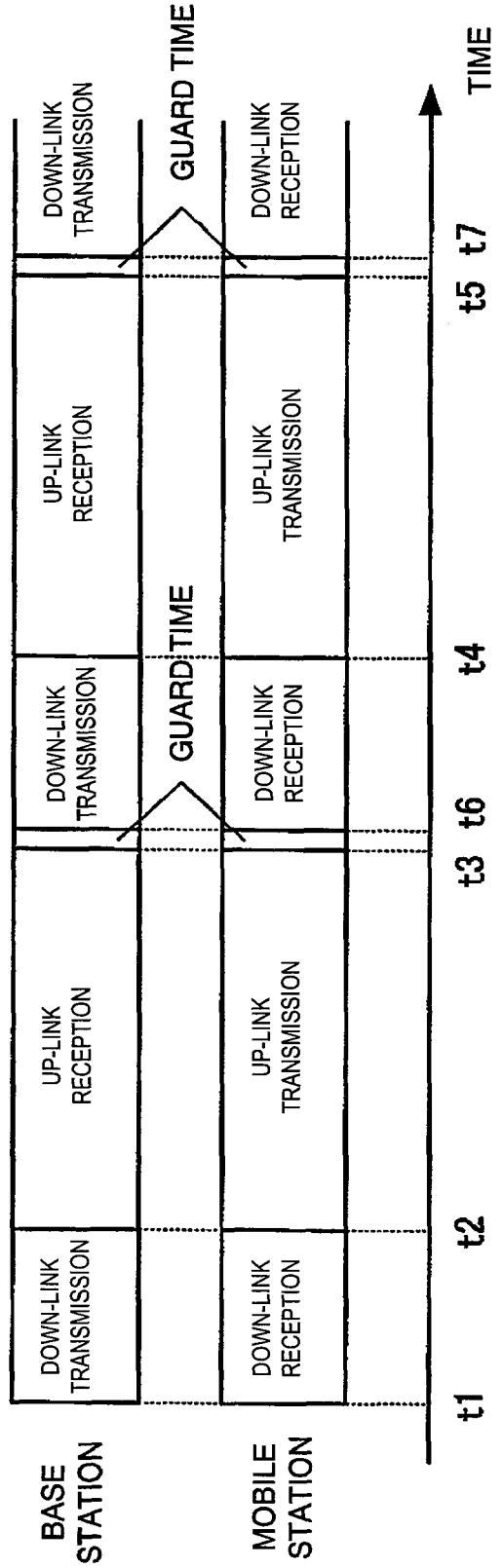
FIG. 7 is a view showing a wireless frame structure in which a guard time is added and an operation state of a base station and a mobile station.

When the synchronizing signal is detected, the base station 300 estimates the wireless frame of the mobile station from the wireless frame data position of the synchronizing signal, and corrects the reception frame timing. Voice data is extracted from the corrected reception frame. This correction operation causes a shift between the transmission frame of the up-link in the base station and the reception frame of the down-link. Then, like the frame structure shown in FIG. 7, guard times (between t3 and t6 and between t5 and t7) are provided between the up-link and the down-link. The adjustment of the correction is performed by the guard time.

Figure 8:
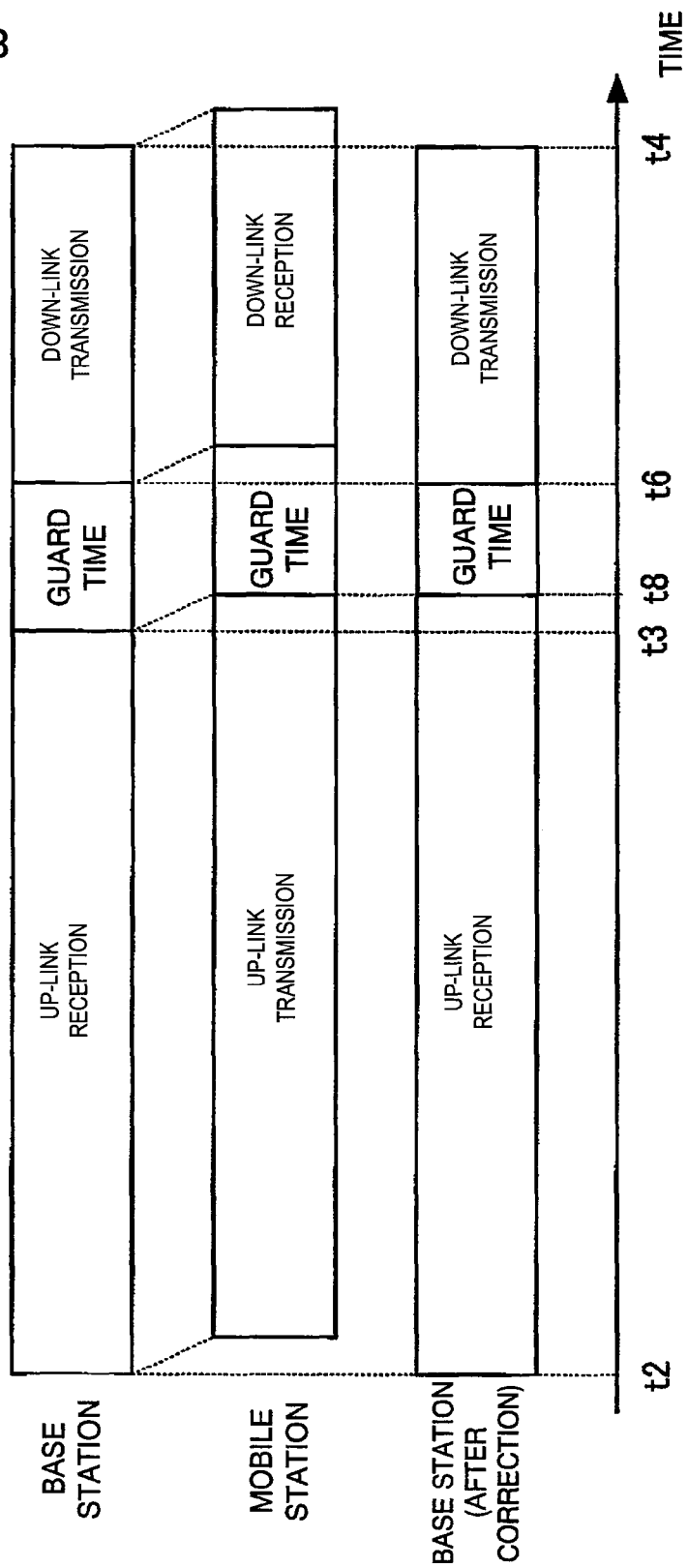
FIG. 8 is a view showing an operation state of a base station corrected by a guard time.

The correction operation of the base station by the guard time will be described in more detail by use of FIG. 8. Consideration is given to a case where there is a shift between the mobile station and the base station as shown in FIG. 8. In this case, when correction is not performed, there is a period (between t3 and t8) in which the reception of data can not be performed in the base station. As a countermeasure against the shift, the reception period of the base station is corrected to one between t2 and t8, and the guard time is corrected to one between t8 and t6.

By this, the wireless frame creating unit 218 of the base station 300 can continue the operation without changing the wireless frame timing of the up-link.

As described above, according to the second embodiment of the invention, the synchronizing signal is superimposed on the down-link, and the extraction position of the voice data is corrected from the detected synchronizing signal, so that the accuracy of the synchronization establishment of the two-way communication can be improved.

Third Embodiment

Figure 9:
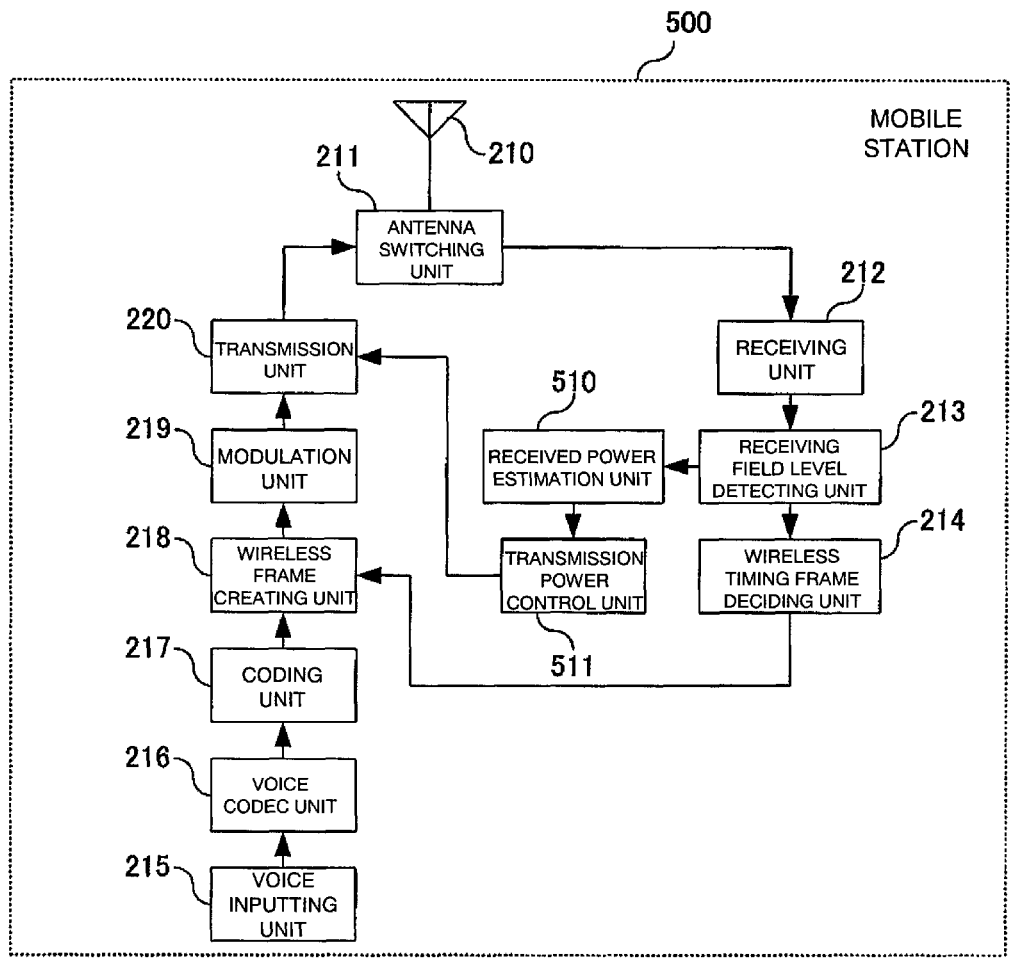
FIG. 9 is a block diagram of a mobile station of a third embodiment of the invention.

FIG. 9 shows a wireless communication equipment of a third embodiment, and in more detail, shows a digital wireless microphone system to perform two-way communication in the TDD system. In FIG. 9, components similar to those of the first embodiment are denoted by the same numbers, and their description will be omitted.

As shown in FIG. 9, the wireless communication equipment of the third embodiment is different from the wireless communication equipment of the first embodiment in that a mobile station 500 includes a received power estimation unit 510 and a transmission power control unit 511.

Next, the operation of the above wireless communication equipment will be described.

The outline of the operation will be described. The base station 100 wireless-transmits a control signal to the mobile station 500, and the mobile station 500 receives the wireless signal from the base station 100 to establish synchronization. The mobile station 500 controls the transmission output power and wireless-transmits the voice signal of a talker. The base station 100 receives the wireless signal from the mobile station 500 and demodulates the voice signal to output a voice signal.

First, the operation of the wireless communication of the up-link will be described.

The base station 100 performs the same operation as that of the first embodiment.

In the mobile station 500, the received power estimation unit 510 extracts the RSSI output of the up-link from the RSSI output generated by a receiving field level detecting unit 213.

Figure 10:
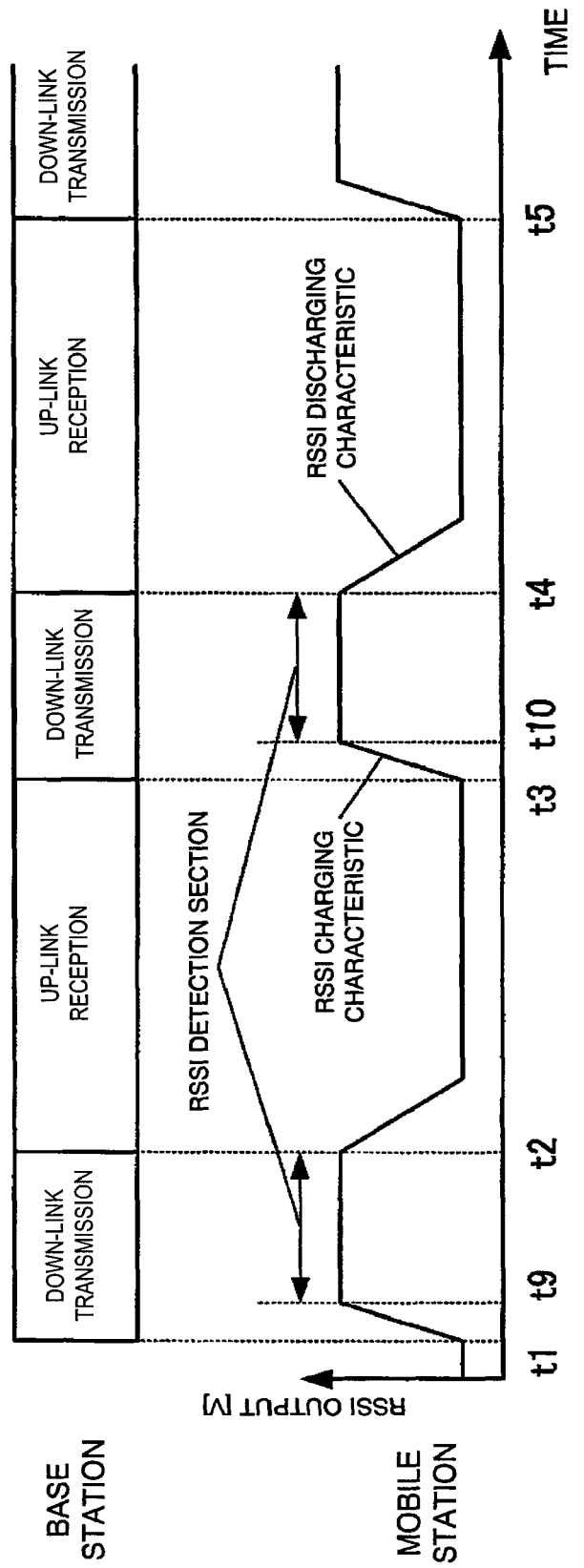
FIG. 10 is view showing a receiving field level detection section in an up-link of a mobile station.

At this time, as shown in FIG. 10, the RSSI output indicates a charging/discharging characteristic by the RSSI circuit. The receiving field level detecting unit 213 samples the RSSI output of the RSSI detection section (between t9 and t2, between t10 and t4) in which the RSSI waveform indicates the received field level, and estimates the received field level from an average value of the sampling. The amount of attenuation of power of an electric wave transmission path between the base station 100 and the mobile station 500 is calculated from the estimated received field level.

Further, the transmission power control unit 511 outputs a transmission power control signal based on the amount of attenuation of the transmission path calculated in the received power estimation unit 510, and controls the transmission output of a transmission unit 220.

As stated above, according to the third embodiment, the received field level of the up-link is estimated from the output of the receiving field level detecting unit 213 for synchronization establishment in the up-link, and the transmission power of the down-link is controlled, so that the synchronization establishment and the transmission power control can be performed without enlarging the mobile station 500.

Besides, by this transmission power control, unnecessary interruption to another station is eliminated, and frequency use efficiency can be improved, and besides, reduction in power consumption can be realized. Besides, a fading suppression effect can also be obtained.

Although the preferred embodiments of the invention conceivable at the present moment have been described, it is understood that various modifications to the embodiments can be made, and it is intended that the appended claims contain all such modifications within the true sprit and scope of the invention.

INDUSTRIAL APPLICABILITY

As described above, according to the invention, the wireless frame timing is decided from the RSSI output at the mobile station side, so that there is obtained an effect that synchronization establishment can be realized even if the mobile station does not include a demodulation circuit. The invention is useful as a wireless microphone communication system or the like.

The invention claimed is:

1. A wireless communication equipment to perform two-way communication between a first transmitter-receiver and a second transmitter-receiver in a time division duplex system, the first transmitter-receiver comprises:
control signal generating means for generating a control signal;
first wireless frame creating means for creating wireless frame data based on the control signal; and
first transmission means for converting the wireless frame data into a wireless signal and transmitting the wireless signal in an up-link of the time division duplex system, and
the second transmitter-receiver comprises:
first receiving means for receiving the wireless signal transmitted from the first transmission means of the first transmitter-receiver;
receiving field level detecting means for comparing a value of a received field level of the wireless signal transmitted from the first transmission means of the first transmitter-receiver and received by the first receiving means during a transient period of the received field level to a reference value that is variable based on the received field level of the wireless signal;
wireless frame timing deciding means for deciding a wireless frame timing based on said comparing the value of the transient characteristic to the reference value to establish synchronization with the first transmitter-receiver;
coding means for coding the control signal and a voice signal;
second wireless frame creating means for creating wireless frame data based on the signal coded by the coding means at the wireless frame timing decided by the wireless frame timing deciding means; and
second transmission means for converting the wireless frame data signal created by the second wireless frame creating means into a wireless signal and transmitting the wireless signal in a down-link of the time division duplex system, and
the first transmitter-receiver comprises:
second receiving means for receiving the wireless signal of the down-link; and
decoding means for decoding the wireless signal of the down-link.

2. The wireless communication equipment according to claim 1,
the second transmitter-receiver includes synchronizing signal generating means for generating a synchronizing signal to be multiplexed onto the down-link, and
the first transmitter-receiver includes synchronizing signal judgment means for performing synchronization judgment by detecting the synchronizing signal such that synchronization correction is performed in the down-link.

3. The wireless communication equipment according to claim 1, wherein the second transmitter-receiver comprises:
received power estimation means for estimating received power from the receiving field level obtained by the receiving field level detecting means; and
transmission power control means for controlling transmission power according to the received power estimated by the received power estimation means.

4. The wireless communication equipment according to claim 1, wherein a table of the reference values for respective received field levels of the wireless signal is set, and the reference value is decided by referencing the table according to the received field level of the wireless signal.

5. A wireless communication method in a wireless communication equipment to perform communication in a time division duplex system, the wireless communication equipment comprising a receiver and a transmitter, the method comprising:
receiving a wireless signal transmitted from the transmitter;
a receiving field level detecting step of comparing a value of a transient characteristic of a received field level of the wireless signal transmitted from the transmitter and received by the receiver to a reference value that is variable based on the received field level of the wireless signal;
a wireless frame timing calculation step of calculating a wireless frame timing based on said comparing the value of the transient characteristic of the receiving field level to the reference value to establish synchronization with the transmitter;
a wireless frame creating step of creating a wireless frame at the timing calculated at the wireless frame timing calculation step;
an initial lead-in step of starting a wireless communication operation of the TDD system at the wireless frame timing created at the wireless frame creating step;
a coding step of coding a control signal and a voice signal;
a second wireless frame creating step of creating wireless frame data based on the signal coded by the coding step at the wireless frame timing decided by the wireless frame timing calculation step;
converting the wireless frame data signal created by the second wireless frame creating step into a wireless signal and transmitting the wireless signal in a down-link of the time division duplex system:
receiving the wireless signal of the down-link; and
decoding the wireless signal of the down-link.

6. A wireless communication equipment to perform two-way communication between a first transmitter-receiver and a second transmitter-receiver in a time division duplex system, the first transmitter-receiver comprises:
a control signal generating unit to generate a control signal;
a first wireless frame creating unit to create wireless frame data based on the control signal; and
a first transmission unit to convert the wireless frame data into a wireless signal and to transmit the wireless signal in an up-link of the time division duplex system, and
the second transmitter-receiver comprises:
a first receiving unit to receive the wireless signal transmitted from the first transmission unit of the first transmitter-receiver;
a receiving field level detecting unit to detect a value of a received field level of the wireless signal transmitted from the first transmission unit of the first transmitter-receiver and received by the first receiving unit and to perform a comparison of the value of the received field level during a transient period of the wireless signal to a reference value;
a wireless frame timing deciding unit to decide a wireless frame timing based on the comparison of the value of the received field level to the reference value to establish synchronization with the first transmitter-receiver;
coding means for coding the control signal and a voice signal;
second wireless frame creating means for creating wireless frame data based on the signal coded by the coding means at the wireless frame timing decided by the wireless frame timing deciding unit; and second transmission means for converting the wireless frame data signal created by the second wireless frame creating means into a wireless signal and transmitting the wireless signal in a down-link of the time division duplex system, and the first transmitter-receiver comprises:

second receiving means for receiving the wireless signal of the down-link; and decoding means for decoding the wireless signal of the down-link.

7. A wireless communication equipment to perform two-way communication between a base station and a mobile station in a time division duplex system, the base station comprises:

a control signal generating unit to generate a control signal;

a base station side wireless frame creating unit to create wireless frame data based on the control signal; and a base station side transmission unit to convert the wireless frame data into a wireless signal and to transmit the wireless signal in an up-link of the time division duplex system, and the mobile station comprises:

a mobile station side receiving unit to receive the wireless signal transmitted from the base station side transmission unit of the base station;

a receiving field level detecting unit to detect a value of a received field level of the wireless signal transmitted from the base station side transmission unit of the base station and received by the receiving unit and to perform a comparison of the value of the received field level during a transient period of the received field level to a reference value that is variable based on a maximum value of the received field level;

a wireless frame timing deciding unit to decide a wireless frame timing based on the comparison to establish synchronization with the base station;

coding means for coding the control signal and a voice signal;

second wireless frame creating means for creating wireless frame data based on the signal coded by the coding means at the wireless frame timing decided by the wireless frame timing deciding unit; and second transmission means for converting the wireless frame data signal created by the second wireless frame creating means into a wireless signal and transmitting the wireless signal in a down-link of the time division duplex system, and the base station comprises:

second receiving means for receiving the wireless signal of the down-link; and decoding means for decoding the wireless signal of the down-link.

8. A wireless communication method in a wireless communication equipment to perform communication in a time division duplex system, the wireless communication equipment comprising a receiver, the method comprising:

receiving a wireless signal transmitted from a transmitter;

detecting a transient characteristic of a received field level of the wireless signal transmitted from the transmitter and received by the receiver;

setting a table of trigger levels for respective received field levels;

calculating a wireless frame timing based on a detection result of the transient characteristic to establish synchronization with the transmitter, said calculating including selecting a trigger level from the table of trigger levels based on a maximum value of the received field level of the wireless signal received by the receiver;

creating a wireless frame at the calculated timing;

starting a wireless communication operation of the TDD system including operating the receiver at the created wireless frame timing;

a coding step of coding a control signal and a voice signal;

a second wireless frame creatine step of creatin wireless frame data based on the signal coded by the coding step at the wireless frame timing decided by the wireless frame timing calculation step;

converting the wireless frame data signal created by the second wireless frame creating step into a wireless signal and transmitting the wireless signal in a down-link of the time division duplex system;

receiving the wireless signal of the down-link; and decoding the wireless signal of the down-link.

* * * * *

UNITED STATES PATENT AND TRADEMARK OFFICE
CERTIFICATE OF CORRECTION

PATENT NO. : 8,089,950 B2
APPLICATION NO. : 11/571892
DATED : January 3, 2012
INVENTOR(S) : Motoshi Suzuki et al.

It is certified that error appears in the above-identified patent and that said Letters Patent is hereby corrected as shown below:

In column 14, line 32, please delete "creatine" and instead insert --creating--

In column 14, line 32, please delete "creatin" and instead insert --creating--

Signed and Sealed this
Twenty-first Day of August, 2012

David J. Kappos
*Director of the United States Patent and Trademark Office*